US012105374B2

(12) United States Patent
Tong

(10) Patent No.: US 12,105,374 B2
(45) Date of Patent: *Oct. 1, 2024

(54) LIQUID CRYSTAL COHERENT TRANSPARENT DISPLAY SCREEN AND LIQUID CRYSTAL-LASER TRANSPARENT DISPLAY SYSTEM

(71) Applicant: SHANXI UNIVERSITY, Shanxi (CN)

(72) Inventor: Zhaomin Tong, Shanxi (CN)

(73) Assignee: SHANXI UNIVERSITY (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,836

(22) Filed: Nov. 16, 2023

(65) Prior Publication Data

US 2024/0210753 A1 Jun. 27, 2024

(30) Foreign Application Priority Data

Dec. 22, 2022 (CN) .......................... 202211656478.0
Aug. 17, 2023 (CN) .......................... 202311042307.3

(51) Int. Cl.
*G02F 1/1335* (2006.01)
*G02F 1/13357* (2006.01)
*G02F 1/1337* (2006.01)

(52) U.S. Cl.
CPC ...... *G02F 1/133555* (2013.01); *G02F 1/1336* (2013.01); *G02F 1/133723* (2013.01)

(58) Field of Classification Search
None
See application file for complete search history.

(56) References Cited

U.S. PATENT DOCUMENTS

| 5,964,475 A | 10/1999 | Gentner et al. |
| 5,969,475 A | 10/1999 | Friend |
| 11,815,763 B1* | 11/2023 | Tong ................. G02F 1/133555 |
| 2008/0129896 A1* | 6/2008 | Kuwata ............... G02B 5/0278 |
| | | 349/1 |
| 2009/0322971 A1 | 12/2009 | Dorjgotov et al. |
| 2017/0371224 A1 | 12/2017 | Seeboth et al. |
| 2019/0265499 A1* | 8/2019 | Kubota .................. G02F 1/167 |
| 2020/0241301 A1 | 7/2020 | Basset |
| 2022/0171273 A1 | 6/2022 | Hayashi et al. |

FOREIGN PATENT DOCUMENTS

| JP | H05273509 A | 10/1993 |
| JP | 2020149040 A | 9/2020 |
| JP | 2020166055 A | 10/2020 |
| WO | 2021039859 A1 | 3/2021 |

OTHER PUBLICATIONS

European Search Report issued in counterpart Application No. 23161492.6 on Aug. 25, 2023.
Office Action issued in counterpart Japanese Patent Application No. 2023-029196 on Jan. 9, 2024.

* cited by examiner

*Primary Examiner* — Paul C Lee
(74) *Attorney, Agent, or Firm* — The Belles Group, P.C.

(57) ABSTRACT

A liquid crystal coherent transparent display screen and a liquid crystal-laser transparent display system are provided. The polarizer, the analyzer and the optical filters in the conventional technology are replaced by an optical resonant microcavity formed by the first partial reflector and the second partial reflector in the liquid crystal coherent transparent display screen, thereby improving the light transmittance of liquid crystal transparent display.

14 Claims, 11 Drawing Sheets

Laser illumination light field

LIQUID CRYSTAL COHERENT TRANSPARENT DISPLAY SCREEN AND LIQUID CRYSTAL-LASER TRANSPARENT DISPLAY SYSTEM

CROSS-REFERENCE TO RELATED APPLICATIONS

This application claims benefit of priority to Chinese patent application 202211656478.0, titled "LIQUID CRYSTAL COHERENT TRANSPARENT DISPLAY SCREEN AND LIQUID CRYSTAL-LASER TRANSPARENT DISPLAY SYSTEM", filed on Dec. 22, 2022, with the China National Intellectual Property Administration, and to Chinese patent application 202311042307.3, titled "LIQUID CRYSTAL COHERENT TRANSPARENT DISPLAY SCREEN AND LIQUID CRYSTAL-LASER TRANSPARENT DISPLAY SYSTEM", filed on Aug. 17, 2023, with the China National Intellectual Property Administration, which are incorporated herein by reference in their entirety.

TECHNICAL FIELD

The present disclosure relates to the technical field of display, more specifically, to a liquid crystal coherent transparent display screen and a liquid crystal-laser transparent display system.

BACKGROUND

With the continuous development of science and technology, various display technologies are widely used in daily life and work, bringing great convenience to daily life.

Transparent display technology is used to display an image on a transparent medium, which can mix displayed content and an application scenario, such as a mixture of virtual displayed content and the real application scenario on a glass.

Transparent display based on liquid crystal display is a common transparent display technology. A liquid crystal transparent display system is mainly formed by a broad-spectrum lighting source and a liquid crystal transparent display screen. A basic display principle thereof is that polarized light is generated by passing non-polarized broad-spectrum light through a polarizer, a liquid crystal state and a polarized state of the light are modified through an electric field, and brightness modulation and contrast display are achieved by an analyzer orthogonal to the polarizer. In addition, in order to generate color image information, the broad-spectrum light is filtered to generate three primary colors of red, green and blue, and thus the liquid crystal transparent display system further includes optical filters.

The liquid crystal transparent display system according to the conventional technology includes the polarizer, the analyzer and optical filters, resulting in low light transmittance during liquid crystal transparent display, where the transmittance normally ranges from 5% to 10%.

SUMMARY

In view of this, in order to solve the above problems, a liquid crystal coherent transparent display screen and a liquid crystal-laser transparent display system are provided according to the present disclosure. The following technical solutions are provided.

A liquid crystal coherent transparent display screen is provided, which includes: a first substrate; a second substrate, wherein the second substrate is arranged opposite to the first substrate; a first alignment layer, arranged on a side of the first substrate facing the second substrate; a second alignment layer, arranged on a side of the second substrate facing the first substrate; a liquid crystal layer, arranged between the first alignment layer and the second alignment layer; a first electrode layer; a first partial reflector, wherein the first electrode layer and the first partial reflector are stacked between the first alignment layer and the first substrate; a second electrode layer; and a second partial reflector, wherein the second electrode layer and the second partial reflector are stacked between the second alignment layer and the second substrate, where the first partial reflector is arranged between the first electrode layer and the first substrate, and the second partial reflector is arranged between the second electrode layer and the second substrate; the first electrode layer is arranged between the first partial reflector and the first substrate, and the second partial reflector is arranged between the second electrode layer and the second substrate; or the first partial reflector is arranged between the first electrode layer and the first substrate, and the second electrode layer is arranged between the second partial reflector and the second substrate.

In an embodiment, in the liquid crystal coherent transparent display screen, the first substrate is a glass substrate, and the second substrate is a glass substrate.

In an embodiment, in the liquid crystal coherent transparent display screen, the first electrode layer is made of indium tin oxide, and the second electrode layer is made of indium tin oxide.

In an embodiment, in the liquid crystal coherent transparent display screen, the first alignment layer is made of polyimide, and the second alignment layer is made of polyimide.

In an embodiment, in the liquid crystal coherent transparent display screen, the first partial reflector is a single-layer film or a multi-layer film, and the second partial reflector is a single-layer film or a multi-layer film.

A liquid crystal-laser transparent display system is further provided according to the present disclosure, which includes a light source, an optical module and the liquid crystal coherent transparent display screen described above.

In an embodiment, in the liquid crystal-laser transparent display system, the optical module includes an optical homogenizer. The optical homogenizer is configured to perform homogenizing on light emitted by the light source.

In an embodiment, in the liquid crystal-laser transparent display system, the optical module further includes a beam shaper. The beam shaper is configured to perform shaping on light outputted by the optical homogenizer.

In an embodiment, in the liquid crystal-laser transparent display system, the optical module further includes an optical lens. The optical lens is configured to transmit light outputted by the beam shaper to the liquid crystal coherent transparent display screen.

In an embodiment, in the liquid crystal-laser transparent display system, the light source is a laser light source.

Compared with the conventional technology, the present disclosure has the following beneficial effects.

The liquid crystal coherent transparent display screen according to the present disclosure includes a first substrate and a second substrate that are arranged opposite to each other; a first alignment layer arranged on a side of the first substrate facing the second substrate; a second alignment layer arranged on a side of the second substrate facing the first substrate; a liquid crystal layer arranged between the first alignment layer and the second alignment layer; a first electrode layer and a first partial reflector that are stacked between the first alignment layer and the first substrate; a second electrode layer and a second partial reflector that are stacked between the second alignment layer and the second substrate. The first electrode layer is arranged between the first partial reflector and the first substrate, and the second electrode layer is arranged between the second partial reflector and the second substrate; the first partial reflector is arranged between the first electrode layer and the first substrate, and the second partial reflector is arranged between the second electrode layer and the second substrate; the first electrode layer is arranged between the first partial reflector and the first substrate, and the second partial reflector is arranged between the second electrode layer and the second substrate; or the first partial reflector is arranged between the first electrode layer and the first substrate, and the second electrode layer is arranged between the second partial reflector and the second substrate. The polarizer, the analyzer and the optical filters in the conventional technology are replaced by an optical resonant microcavity formed by the first partial reflector and the second partial reflector in the liquid crystal coherent transparent display screen, thereby improving the light transmittance of liquid crystal transparent display.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

In order to make the above objectives, features and advantages of the present disclosure to be clear and easily understood, the present disclosure is further described in detail below in conjunction with the drawings and specific embodiments.

Figure 1:
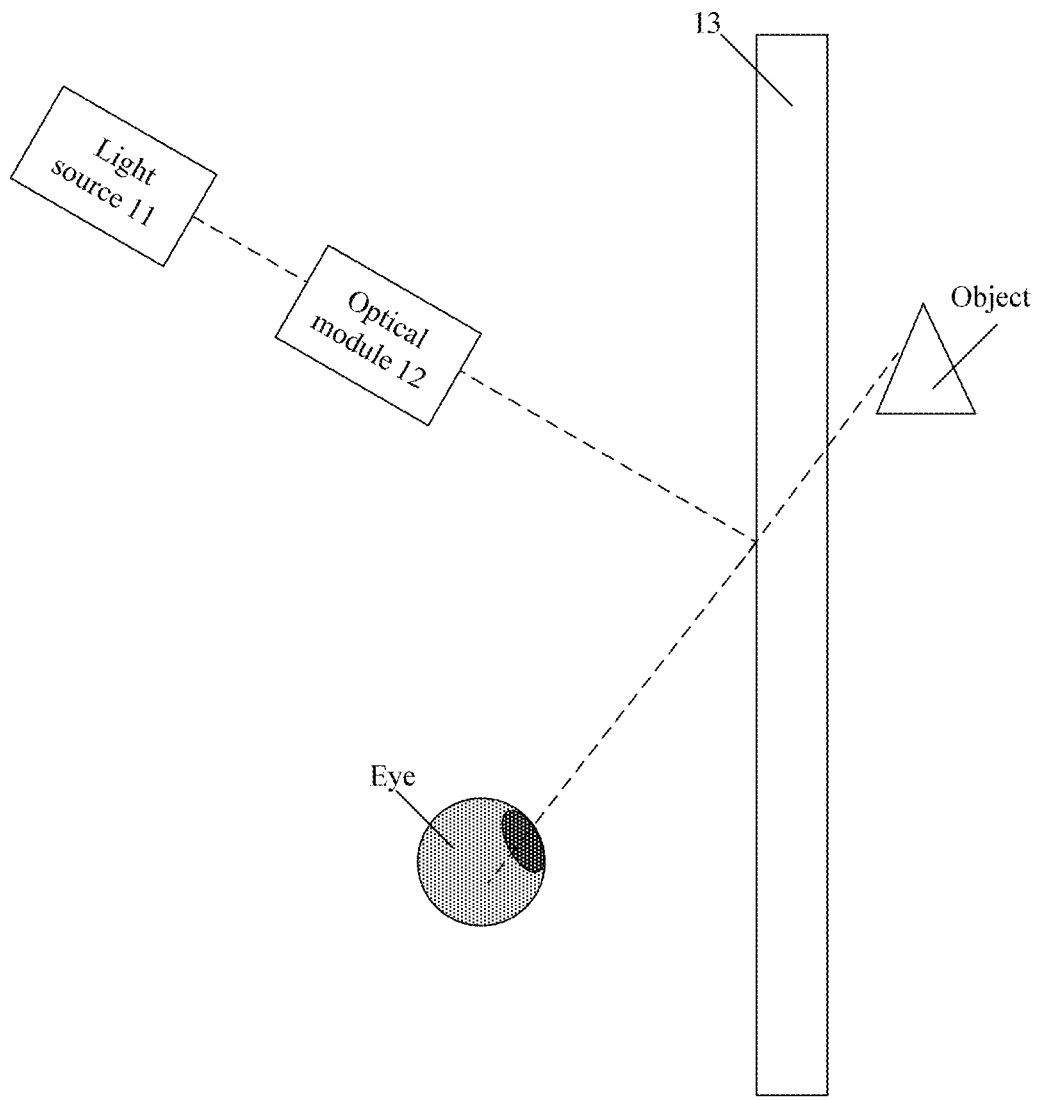
FIG. 1 is a schematic structural diagram of a liquid crystal-laser transparent display system according to an embodiment of the present disclosure.
Figure 2:
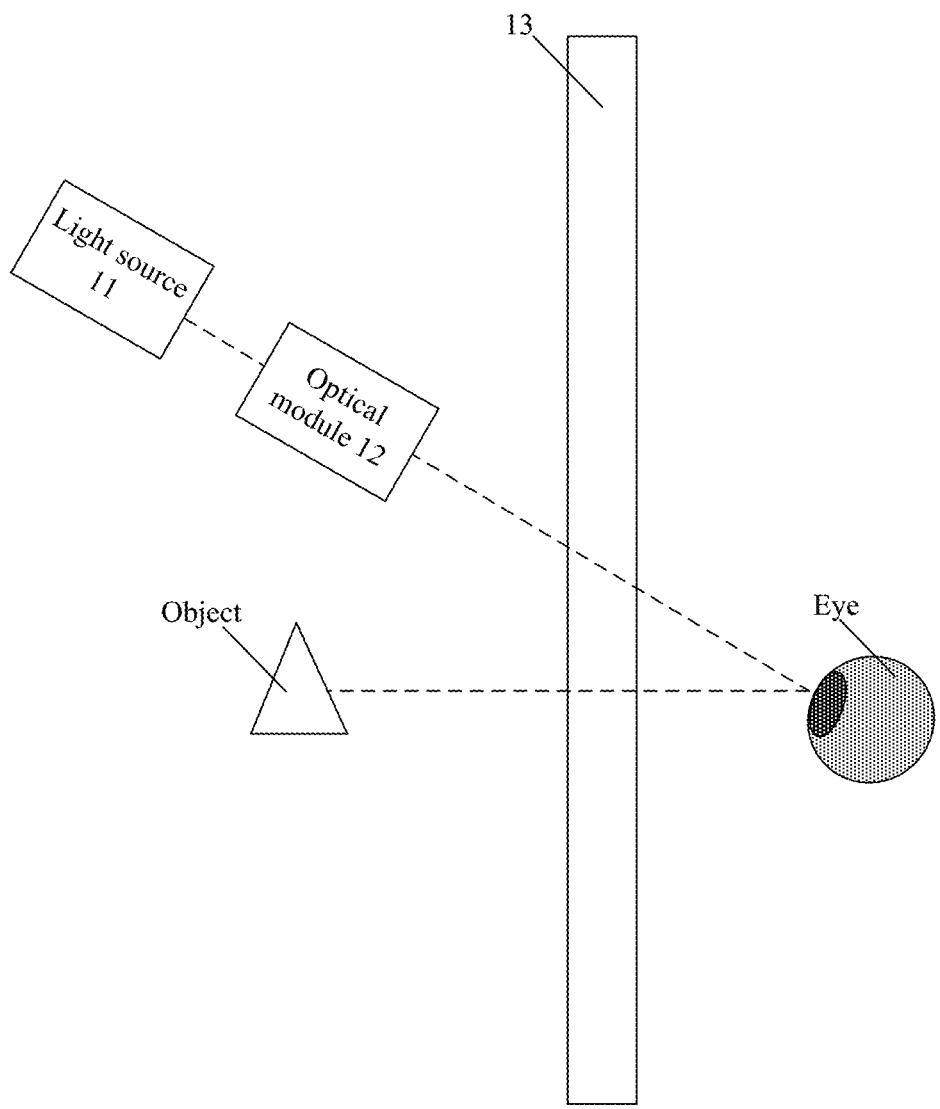
FIG. 2 is a schematic structural diagram of a liquid crystal-laser transparent display system according to an embodiment of the present disclosure.

Reference is made to FIG. 1, which is a schematic structural diagram of a liquid crystal-laser transparent display system according to an embodiment of the present disclosure. Reference is also made to FIG. 2, which is a schematic structural diagram of a liquid crystal-laser transparent display system according to an embodiment of the present disclosure. The liquid crystal-laser transparent display system includes a light source 11, an optical module 12 and a liquid crystal coherent transparent display screen 13 described in the following embodiment.

In the embodiment of the present disclosure, light emitted by the light source 11 is transmitted through the optical module 12 to light the liquid crystal coherent transparent display screen 13. As shown in FIG. 1, the liquid crystal coherent transparent display screen 13 operates in a reflection mode, and an eye of an observer and the light source 11 are located on a same side of the liquid crystal coherent transparent display screen 13. As shown in FIG. 2, the liquid crystal coherent transparent display screen 13 operates in a transmission mode, and an eye of an observer and the light source 11 are respectively located on two sides of the liquid crystal coherent transparent display screen 13, achieving a liquid crystal-laser transparent display (LC-LTD) technology without any polarizer or optical filters. The LC-LTD technology without any polarizer or optical filters has an advantage of high transmittance for incoherent natural light.

Figure 3:
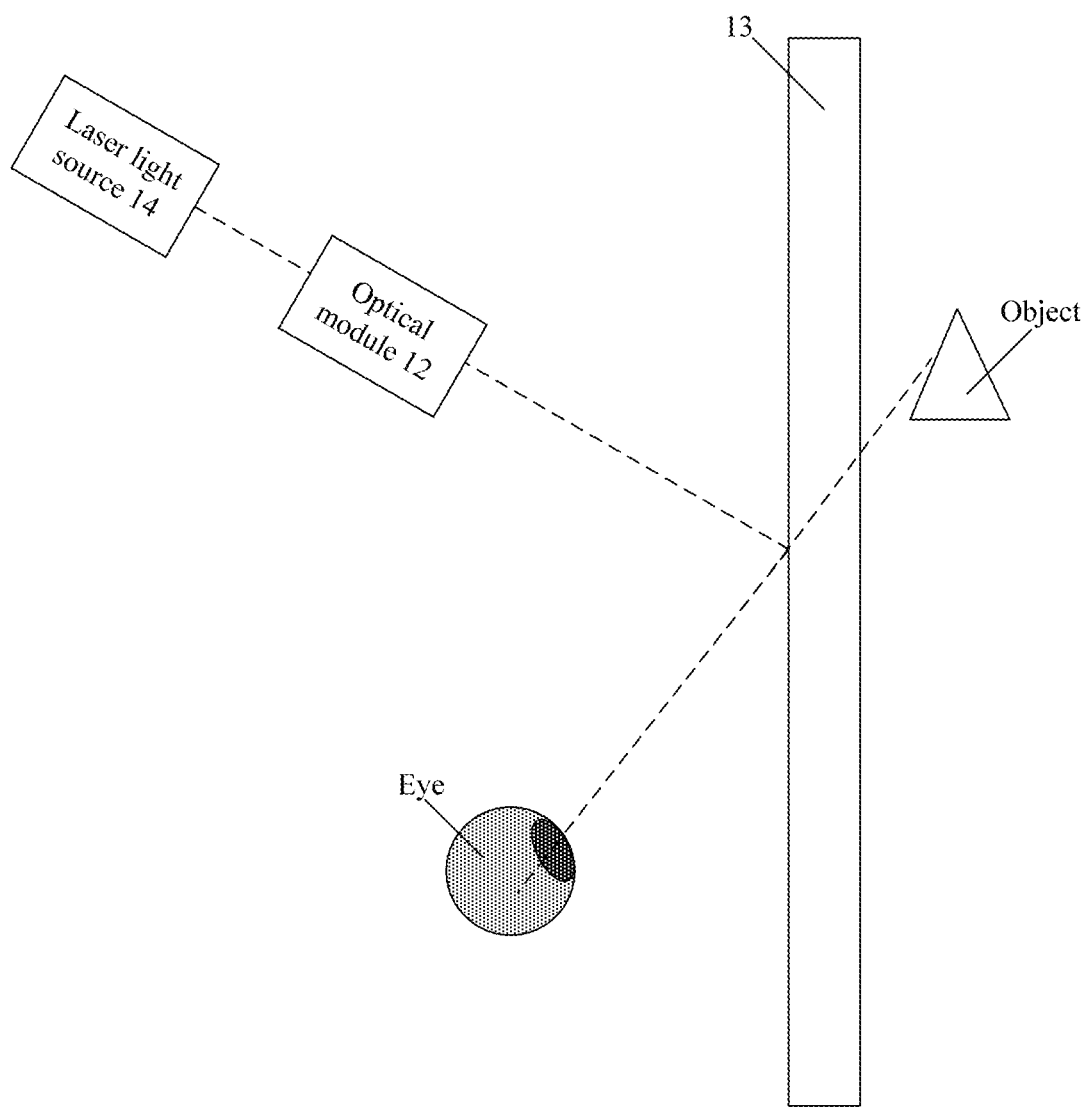
FIG. 3 is a schematic structural diagram of a liquid crystal-laser transparent display system according to an embodiment of the present disclosure.

Reference is made to FIG. 3, which is a schematic structural diagram of a liquid crystal-laser transparent display system according to an embodiment of the present disclosure. The liquid crystal coherent transparent display screen 13 operates in the reflection mode for example.

The light source 11 is a laser light source 14.

In the embodiment of the present disclosure, the laser light source 14 serves as a lighting source of the liquid crystal-laser transparent display system. The laser light source 14 has advantages such as good monochromaticity and extremely pure color, so that a display image has a large color gamut. In addition, laser emitted by the laser light source 14 has good directionality, which can achieve higher light utilization efficiency and a high brightness of the display image.

Figure 4:
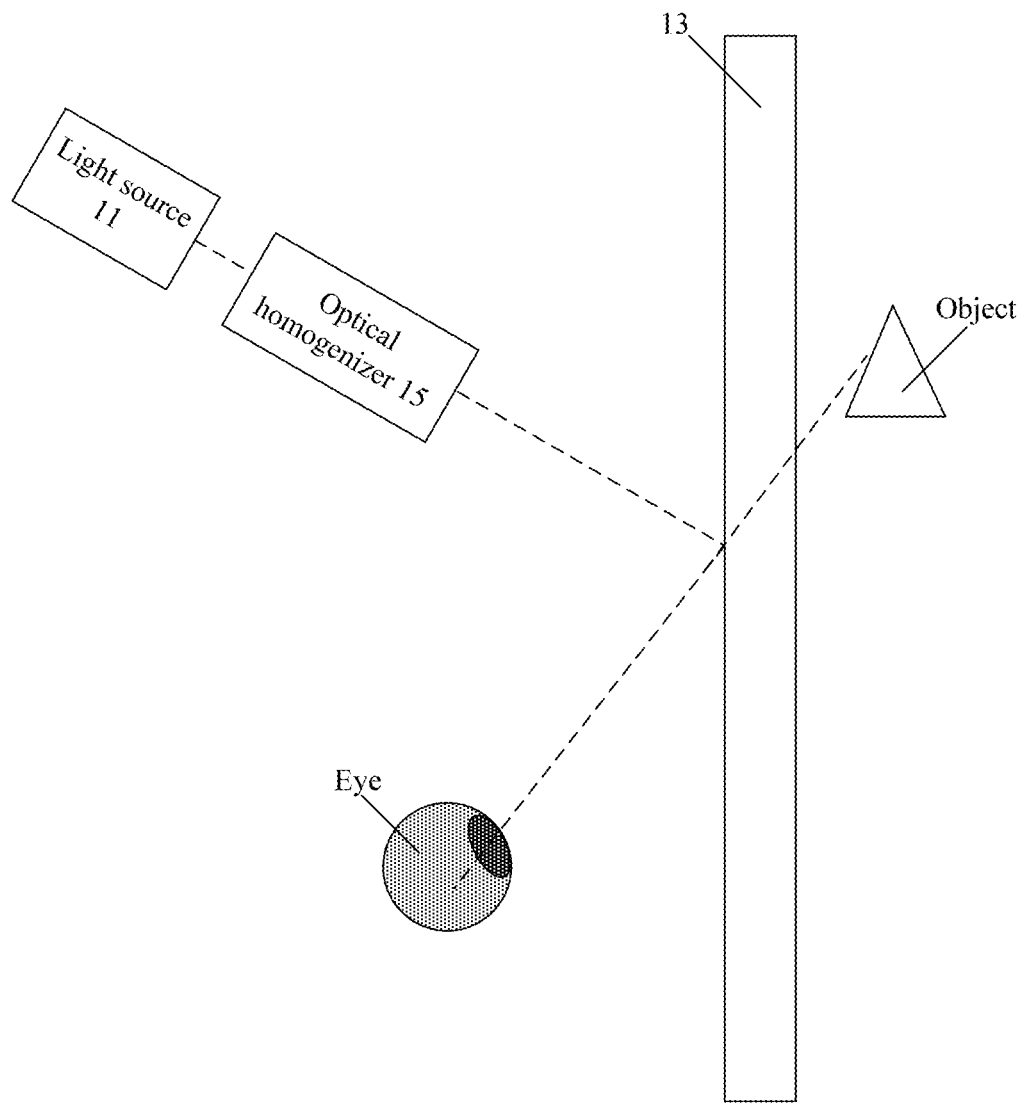
FIG. 4 is a schematic structural diagram of a liquid crystal-laser transparent display system according to an embodiment of the present disclosure.

Reference is made to FIG. 4, which is a schematic structural diagram of a liquid crystal-laser transparent display system according to an embodiment of the present disclosure. The liquid crystal coherent transparent display screen 13 operates in the reflection mode for example.

The optical module 12 includes an optical homogenizer 15.

The optical homogenizer 15 is configured to perform homogenizing on light emitted by the light source 11.

Figure 5:
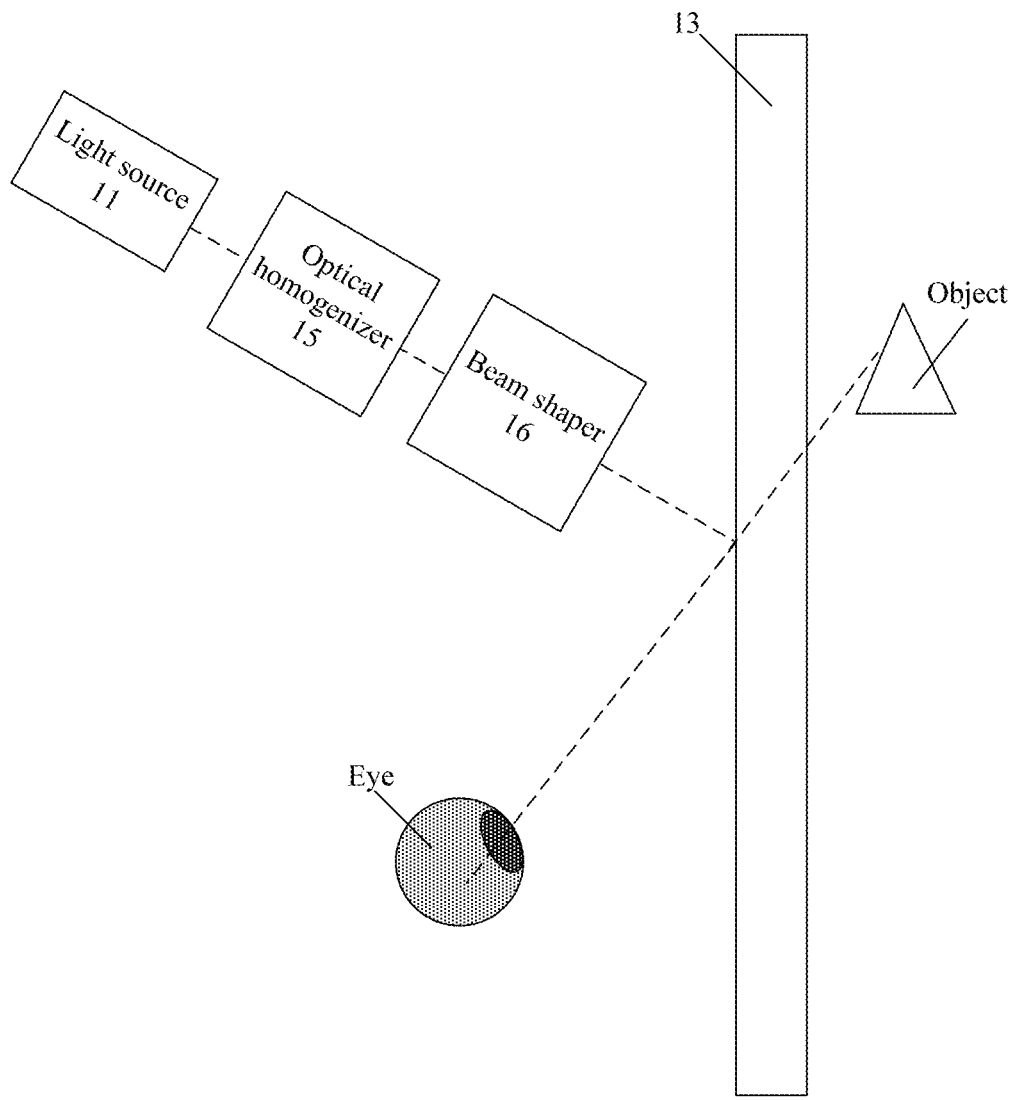
FIG. 5 is a schematic structural diagram of a liquid crystal-laser transparent display system according to an embodiment of the present disclosure.

Reference is made to FIG. 5, which is a schematic structural diagram of a liquid crystal-laser transparent display system according to an embodiment of the present disclosure. The liquid crystal coherent transparent display screen 13 operates in the reflection mode for example.

The optical module 12 further includes a beam shaper 16.

The beam shaper 16 is configured to perform shaping on light outputted by the optical homogenizer 15.

Figure 6:
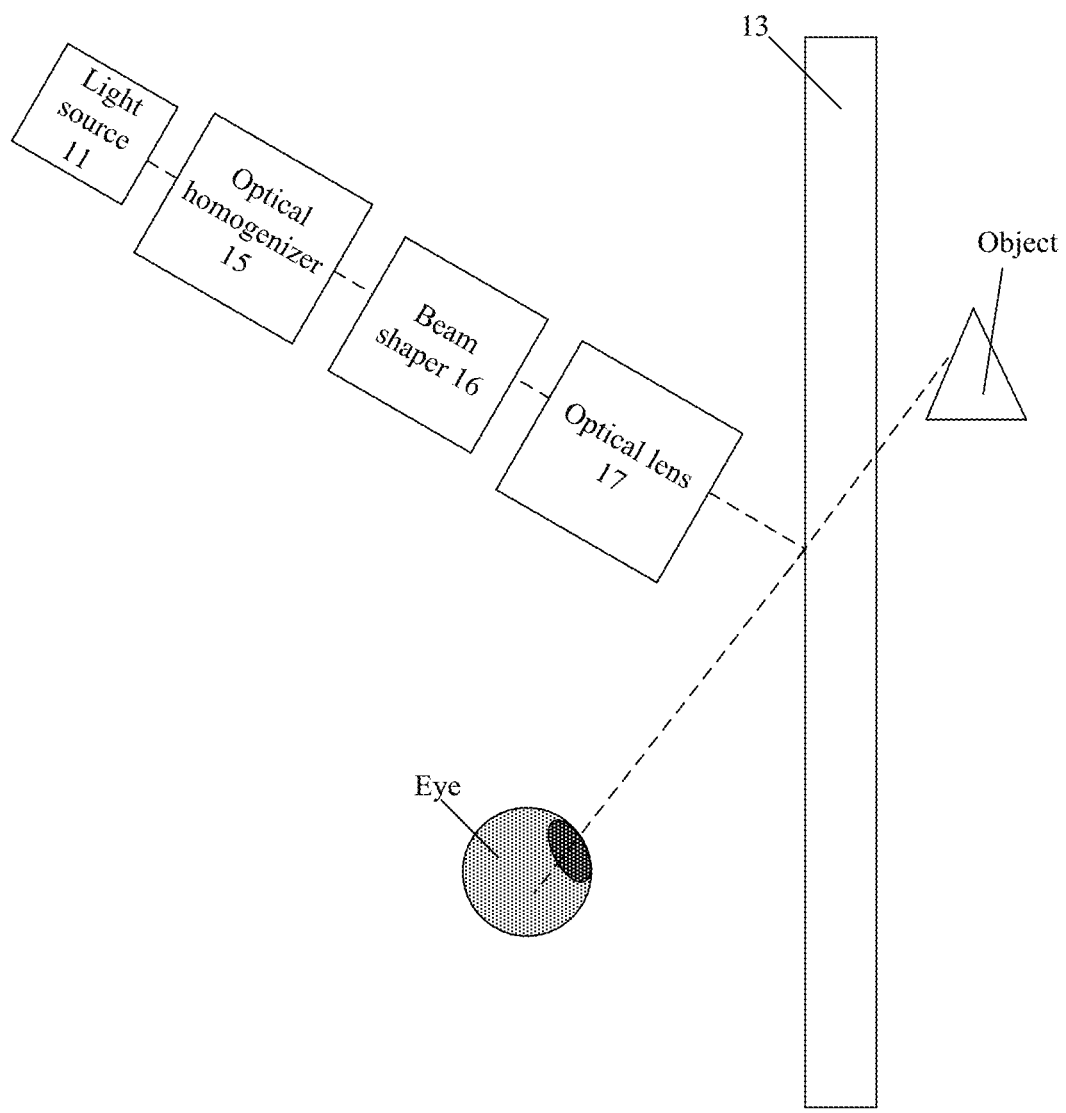
FIG. 6 is a schematic structural diagram of a liquid crystal-laser transparent display system according to an embodiment of the present disclosure.

Reference is made to FIG. 6, which is a schematic structural diagram of a liquid crystal-laser transparent display system according to an embodiment of the present disclosure. The liquid crystal coherent transparent display screen 13 operates in the reflection mode for example.

The optical module 12 further includes an optical lens 17.

The optical lens 17 is configured to transmit light outputted by the beam shaper 16 to the liquid crystal coherent transparent display screen 13.

Figure 7:
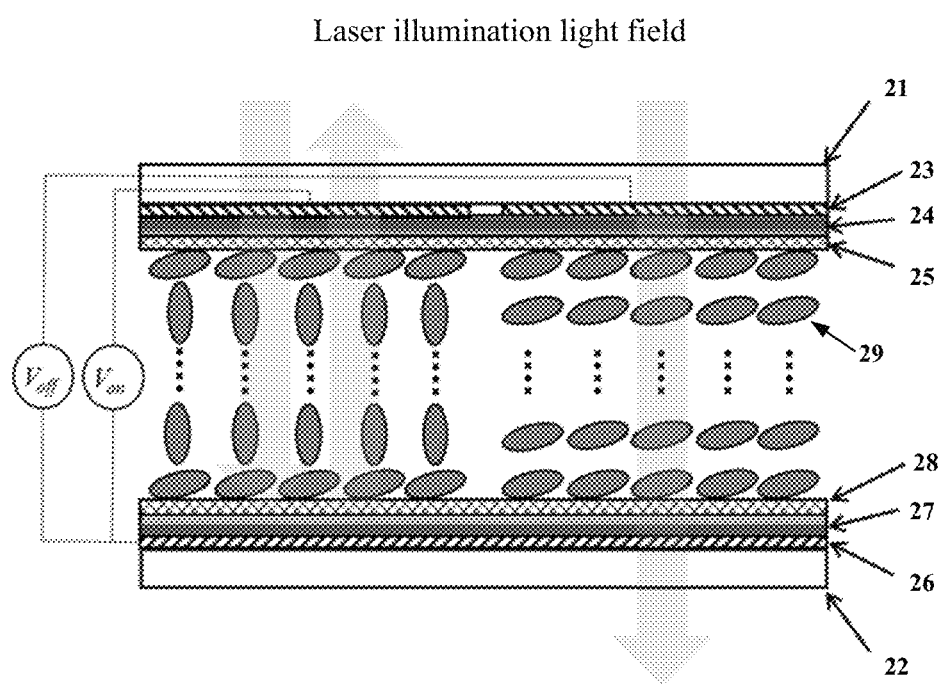
FIG. 7 is a schematic structural diagram of a liquid crystal coherent transparent display screen according to an embodiment of the present disclosure.
Figure 8:
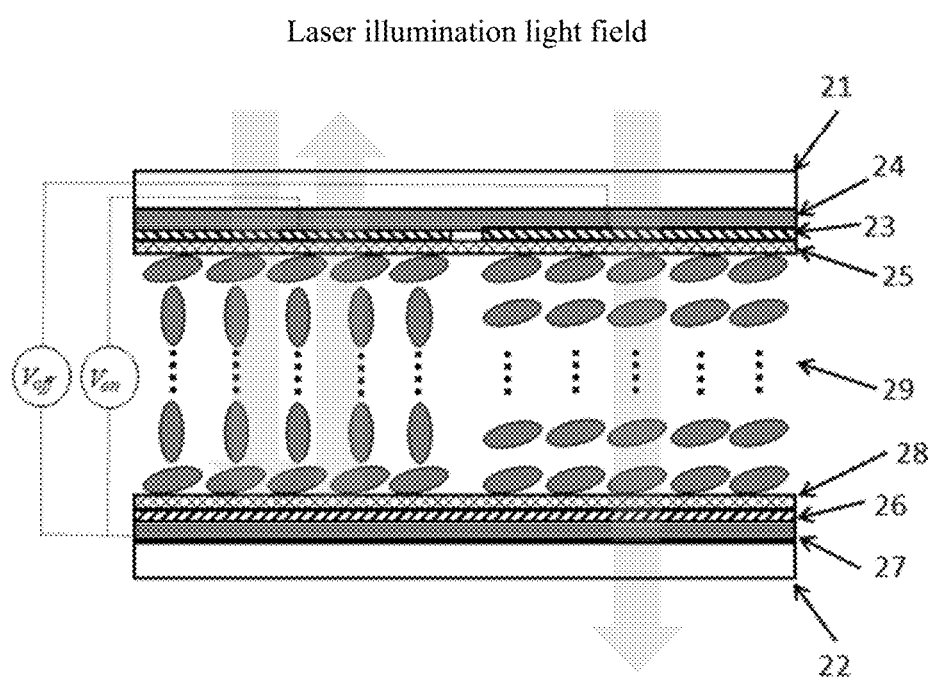
FIG. 8 is a schematic structural diagram of a liquid crystal coherent transparent display screen according to an embodiment of the present disclosure.
Figure 9:
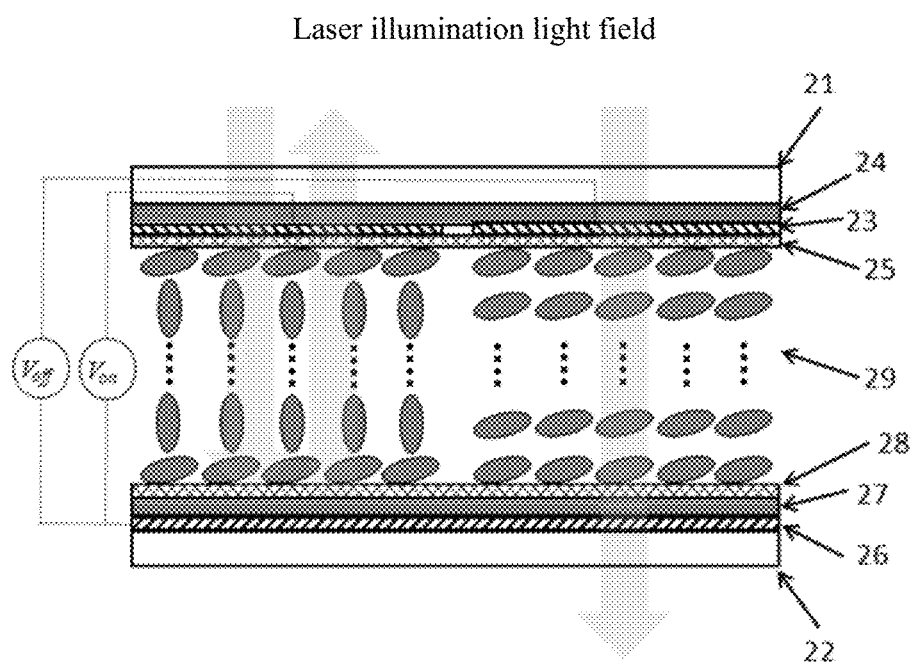
FIG. 9 is a schematic structural diagram of a liquid crystal coherent transparent display screen according to an embodiment of the present disclosure.
Figure 10:
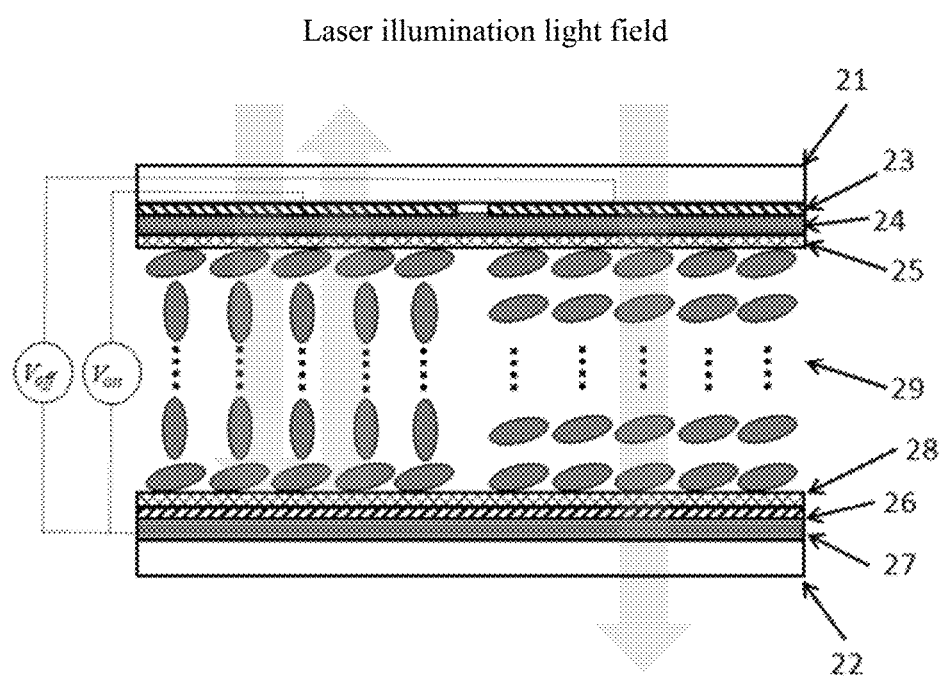
FIG. 10 is a schematic structural diagram of a liquid crystal coherent transparent display screen according to an embodiment of the present disclosure.

Reference is made to FIG. 7, which is a schematic structural diagram of a liquid crystal coherent transparent display screen according to an embodiment of the present disclosure. Reference is made to FIG. 8, which is a schematic structural diagram of a liquid crystal coherent transparent display screen according to an embodiment of the present disclosure. Reference is made to FIG. 9, which is a schematic structural diagram of a liquid crystal coherent transparent display screen according to an embodiment of the present disclosure. Reference is made to FIG. 10, which is a schematic structural diagram of a liquid crystal coherent transparent display screen according to an embodiment of the present disclosure.

The liquid crystal coherent transparent display screen 13 includes a first substrate 21, a second substrate 22, a first electrode layer 23, a first partial reflector 24, a first alignment layer 25, a second electrode layer 26, a second partial reflector 27, a second alignment layer 28, and a liquid crystal layer 29.

The first substrate 21 is arranged opposite to the second substrate 22.

The first alignment layer 25 is arranged on a side of the first substrate 21 facing the second substrate 22.

The second alignment layer 28 is arranged on a side of the second substrate 22 facing the first substrate 21.

The liquid crystal layer 29 is arranged between the first alignment layer 25 and the second alignment layer 28.

The first electrode layer 23 and the first partial reflector 24 are stacked between the first alignment layer 25 and the first substrate 21.

The second electrode layer 26 and the second partial reflector 27 are stacked between the second alignment layer 28 and the second substrate 22.

As shown in FIG. 7, the first electrode layer 23 is arranged between the first partial reflector 24 and the first substrate 21, and the second electrode layer 26 is arranged between the second partial reflector 27 and the second substrate 22. Alternatively, as shown in FIG. 8, the first partial reflector 24 is arranged between the first electrode layer 23 and the first substrate 21, and the second partial reflector 27 is arranged between the second electrode layer 26 and the second substrate 22. Alternatively, as shown in FIG. 9, the first partial reflector 24 is arranged between the first electrode layer 23 and the first substrate 21, and the second electrode layer 26 is arranged between the second partial reflector 27 and the second substrate 22. Alternatively, as shown in FIG. 10, the first electrode layer 23 is arranged between the first partial reflector 24 and the first substrate 21, and the second partial reflector 27 is arranged between the second electrode layer 26 and the second substrate 22.

In the embodiment of the present disclosure, the embodiment is illustrated by taking two pixels as an example. The liquid crystal coherent transparent display screen 13 has a structure shown in FIGS. 7, 8, 9 and 10, which includes the first substrate 21, the second substrate 22, the first electrode layer 23, the first partial reflector 24, the first alignment layer 25, the second electrode layer 26, the second partial reflector 27, the second alignment layer 28 and the liquid crystal layer 29. The first electrode layer 23 and the second electrode layer 26 are configured to apply an electric field signal to liquid crystal in the liquid crystal layer 29. The first alignment layer 25 and the second alignment layer 28 are configured to anchor the liquid crystal in the liquid crystal layer 29.

Further, in the embodiment of the present disclosure, an optical resonant microcavity is formed by the first partial reflector 24 and the second partial reflector 27 in the liquid crystal coherent transparent display screen 13, without the involvement of the polarizer, the analyzer and the optical filters in conventional technology, thereby improving the light transmittance of liquid crystal transparent display.

As shown in FIGS. 7, 8, 9 and 10, the first electrode layer 23 and the second electrode layer 26 apply different voltage signals Von and Voff to a pixel at the left and a pixel at the right. Therefore, a liquid crystal state and an equivalent refractive index of liquid crystal of the pixel at the left are different from a liquid crystal state and an equivalent refractive index of liquid crystal of the pixel at the right, so that corresponding optical resonant microcavities have different equivalent cavity lengths and reflection or transmission spectrums.

Figure 11:
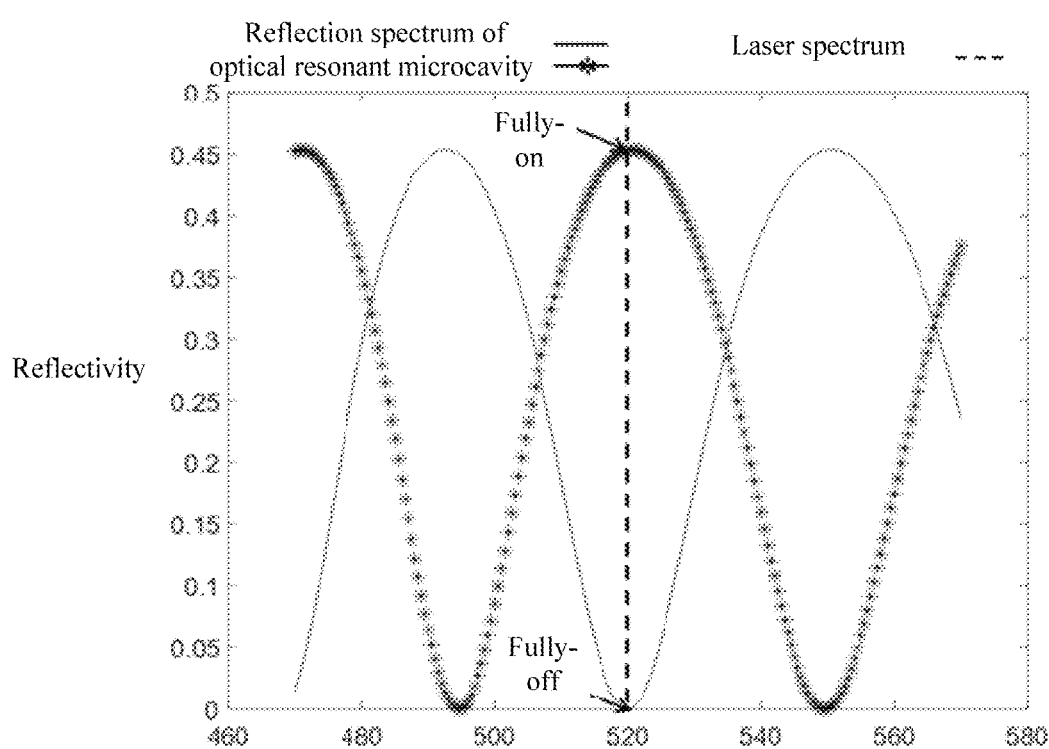
FIG. 11 is a schematic diagram showing a reflection spectrum of a pixel in the liquid crystal coherent transparent display screen shown in FIG. 7.

Further, reference is made to FIG. 11, which is a schematic diagram showing a reflection spectrum of a pixel in the liquid crystal coherent transparent display screen shown in FIG. 7. FIG. 11 shows a reflection spectrum of the pixel after a "fully-on" voltage and a "fully-off" voltage are applied to the pixel on the liquid crystal coherent transparent display screen 13, in a case that a laser wavelength is 520 nm.

It should be noted that in FIG. 10, a refractive index of the liquid crystal before and after the voltage is applied ranges from 1.58 to 1.67, each of the first electrode layer 23 and the second electrode layer 26 has a thickness of 50 nm, reflectivity of each of the first partial reflector 24 and the second partial reflector 27 is 0.15, the liquid-crystal layer 29 has a thickness of 1.5 μm, and the laser has an incident angle of 9.2°.

When the "fully-on" voltage is applied to the pixel, a peak of the reflection spectrum of the pixel is overlapped with the laser wavelength, and thus the pixel has a maximum brightness. When the "fully-off" voltage is applied to the pixel, a valley of the reflection spectrum of the pixel is overlapped with the laser wavelength, and thus the pixel has a minimum brightness.

It can be seen from the above description that the LC-LTD technology without any polarizer or optical filters according to the embodiment of the present disclosure fully utilizes a high coherence spectrum feature of the laser light source, and the reflection spectrum of the optical resonant microcavity is changed by modifying the equivalent refractive index of the liquid crystal, thereby achieving brightness modification and contrast display.

In an embodiment of the present disclosure, the first substrate 21 may be a glass substrate, and the second substrate 22 may be a glass substrate.

It should be noted that each of the first substrate 21 and the second substrate 22 may also be made with any other transparent material. In the embodiment of the present disclosure, each of the first substrate 21 and the second substrate 22 is a glass substrate, for example.

In an embodiment of the present disclosure, the first electrode layer 23 may be made of indium tin oxide, and the second electrode layer 26 may be made of indium tin oxide.

It should be noted that each of the first electrode layer 23 and the second electrode layer 26 may alternatively be an electrode layer made of any other transparent material. In the embodiment of the present disclosure, each of the first electrode layer 23 and the second electrode layer 26 is a transparent electrode layer made of indium tin oxide, for example.

In an embodiment of the present disclosure, the first alignment layer 25 may be made of polyimide, and the second alignment layer 28 may be made of polyimide.

It should be noted that each of the first alignment layer 25 and the second alignment layer 28 may alternatively be made of any other commonly used material. In the embodiment of the present disclosure, each of the first alignment layer 25 and the second alignment layer 28 is made of polyimide, for example.

In an embodiment of the present disclosure, the first partial reflector 24 may be a single-layer film, made of a high refractive index material, for example, $Ta_2O_5$, and the second partial reflector 27 may be a single-layer film, made of a high refractive index material, for example, $Ta_2O_5$.

It should be noted that the first partial reflector 24 may alternatively be a single-layer film having a low refractive index or a multi-layer film, and the second partial reflector 27 may alternatively be a single-layer film having a low refractive index or a multi-layer film. In the embodiment of the present disclosure, each of the first partial reflector 24 and the second partial reflector 27 is the single-layer film, made of a high refractive index material, for example, $Ta_2O_5$.

In an embodiment of the present disclosure, the liquid crystal in the liquid crystal layer 29 is nematic liquid crystal, for example, 5CB liquid crystal.

Further, the principles of the liquid crystal coherent transparent display screen and the liquid crystal-laser transparent display system according to the embodiments of the present disclosure are further described in conjunction with the following specific example.

When laser illuminates the optical resonant microcavity, the laser is reflected and transmitted multiple times on surfaces of the first partial reflector 24 and the second partial reflector 27, and multi-beam interference occurs. In a case that the transmitted light is in phase (that is, phase difference is an even multiple of $\pi$), constructive interference occurs, which corresponds to a peak of a transmission spectrum of the optical resonant microcavity (that is, a valley of the reflection spectrum). In a case that the transmitted light is out of phase (that is, phase difference is an odd multiple of $\pi$), destructive interference occurs, which corresponds to a valley of the transmission spectrum of the optical resonant microcavity (that is, a peak of the reflection spectrum).

Assuming that the equivalent refractive index of the liquid crystal in the optical resonant microcavity is n, the liquid-crystal layer 29 has a thickness of L, and the laser has an incident angle of $\theta$, an optical path difference between two adjacent reflected beams is expressed as $\Delta L = 2nL \cos\theta$.

In a cast that a phase shift is not considered, a phase difference is expressed as $\delta = (4\pi/\lambda)nL \cos\theta$.

Assuming that the first partial reflector 24 and the second partial reflector 27 have the same reflectivity R, a transmittance function T of the optical resonant microcavity is given by the following equation:

$$T = \frac{(1-R)^2}{1+R^2-2R\cos\theta} = \frac{1}{1+F\sin\left(\frac{\delta}{2}\right)^2} \text{ where } F = \frac{4R}{(1-R)^2}.$$

Without consideration in absorption of light by the mediums, the reflectivity of the optical resonant microcavity is expressed as $R' = 1-T$.

When the voltage changes, liquid crystal molecules are rotated to change the equivalent refractive index n of the liquid crystal, so as to change an equivalent cavity length nL, a transmission spectrum T and a spectrum of the reflectivity R' of the optical resonant microcavity.

When the liquid crystal coherent transparent display screen 13 operates in the reflection mode, in a case that a laser spectrum is overlapped with the peak of the reflection spectrum of the optical resonant microcavity, a brightest image is acquired, and in a case that a laser spectrum is overlapped with the valley of the reflection spectrum of the optical resonant microcavity, a darkest image is acquired. Other voltage signals correspond to intermediate brightness states.

When the liquid crystal coherent transparent display screen 13 operates in the transmission mode, in a case that a laser spectrum is overlapped with the peak of the transmission spectrum of the optical resonant microcavity, a brightest image is acquired, and in a case that a laser spectrum is overlapped with the valley of the transmission spectrum of the optical resonant microcavity, a darkest image is acquired. Other voltage signals correspond to intermediate brightness states.

The liquid crystal-laser transparent display system and the liquid crystal coherent transparent display screen according to the present disclosure are described in detail above. Specific examples are used herein to explain the principle and embodiments of the present disclosure, and the above description of the embodiments is only used to facilitate understanding of the method and core concept of the present disclosure. Those skilled in the art may make changes to the specific embodiments and the application scope of the present disclosure according to the idea of the present disclosure. In view of the above, the content of the specification should not be understood as limitation to the present disclosure.

It should be note that the embodiments in this specification are described in a progressive way, each of the embodiments emphasizes the differences from others, and the same or similar parts among the embodiments may be referred to each other. Since the devices disclosed in the embodiment corresponds to the method disclosed in the embodiment, the description of the device is relatively simple, and reference may be made to the method in the embodiment for the relevant parts.

It should be further noted that the relationship terminologies such as first, second or the like are only used herein to distinguish one entity or operation from another entity or operation, rather than to necessitate or imply that the actual relationship or order exists between the entities or operations. Furthermore, terms of "include", "comprise" or any other variants are intended to be non-exclusive. Therefore, a process, method, article or device including a series of elements includes not only the elements but also other elements that are not enumerated, or also includes the elements inherent for the process, method, article or device. Unless expressively limited otherwise, the statement "comprising (including) one . . . " does not exclude the case that other similar elements may exist in the process, method, article or device.

Based on the above description of the disclosed embodiments, those skilled in the art may implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A liquid crystal coherent transparent display screen, comprising:
a first substrate;
a second substrate, wherein the second substrate is arranged opposite to the first substrate;
a first alignment layer, arranged on a side of the first substrate facing the second substrate;
a second alignment layer, arranged on a side of the second substrate facing the first substrate;
a liquid crystal layer, arranged between the first alignment layer and the second alignment layer;
a first electrode layer;
a first partial reflector, wherein the first electrode layer and the first partial reflector are stacked between the first alignment layer and the first substrate;
a second electrode layer; and
a second partial reflector, wherein the second electrode layer and the second partial reflector are stacked between the second alignment layer and the second substrate,
wherein the first partial reflector is arranged between the first electrode layer and the first substrate, and the second partial reflector is arranged between the second electrode layer and the second substrate; the first electrode layer is arranged between the first partial reflector and the first substrate, and the second partial reflector is arranged between the second electrode layer and the second substrate; or the first partial reflector is arranged between the first electrode layer and the first substrate, and the second electrode layer is arranged between the second partial reflector and the second substrate.

2. The liquid crystal coherent transparent display screen according to claim 1, wherein the first substrate is a glass substrate, and the second substrate is a glass substrate.

3. The liquid crystal coherent transparent display screen according to claim 1, wherein the first electrode layer is made of indium tin oxide, and the second electrode layer is made of indium tin oxide.

4. The liquid crystal coherent transparent display screen according to claim 1, wherein the first alignment layer is made of polyimide, and the second alignment layer is made of polyimide.

5. The liquid crystal coherent transparent display screen according to claim 1, wherein the first partial reflector is a single-layer film or a multi-layer film, and the second partial reflector is a single-layer film or a multiplayer film.

6. A liquid crystal-laser transparent display system, comprising a light source, an optical module and a liquid crystal coherent transparent display screen,
wherein the liquid crystal coherent transparent display screen comprises:
a first substrate;
a second substrate, wherein the second substrate is arranged opposite to the first substrate;
a first alignment layer, arranged on a side of the first substrate facing the second substrate;
a second alignment layer, arranged on a side of the second substrate facing the first substrate;
a liquid crystal layer, arranged between the first alignment layer and the second alignment layer;
a first electrode layer;
a first partial reflector, wherein the first electrode layer and the first partial reflector are stacked between the first alignment layer and the first substrate;
a second electrode layer; and
a second partial reflector, wherein the second electrode layer and the second partial reflector are stacked between the second alignment layer and the second substrate,
wherein the first partial reflector is arranged between the first electrode layer and the first substrate, and the second partial reflector is arranged between the second electrode layer and the second substrate; the first electrode layer is arranged between the first partial reflector and the first substrate, and the second partial reflector is arranged between the second electrode layer and the second substrate; or the first partial reflector is arranged between the first electrode layer and the first substrate, and the second electrode layer is arranged between the second partial reflector and the second substrate.

7. The liquid crystal coherent transparent display screen according to claim 6, wherein the first substrate is a glass substrate, and the second substrate is a glass substrate.

8. The liquid crystal coherent transparent display screen according to claim 6, wherein the first electrode layer is made of indium tin oxide, and the second electrode layer is made of indium tin oxide.

9. The liquid crystal coherent transparent display screen according to claim 6, wherein the first alignment layer is made of polyimide, and the second alignment layer is made of polyimide.

10. The liquid crystal coherent transparent display screen according to claim 6, wherein the first partial reflector is a single-layer film or a multi-layer film, and the second partial reflector is a single-layer film or a multi-layer film.

11. The liquid crystal-laser transparent display system according to claim 6, wherein the optical module comprises an optical homogenizer, wherein
the optical homogenizer is configured to perform homogenizing on light emitted by the light source.

12. The liquid crystal-laser transparent display system according to claim 11, wherein the optical module further comprises a beam shaper, wherein
the beam shaper is configured to perform shaping on light outputted by the optical homogenizer.

13. The liquid crystal-laser transparent display system according to claim 12, wherein the optical module further comprises an optical lens, wherein
the optical lens is configured to transmit light outputted by the beam shaper to the liquid crystal coherent transparent display screen.

14. The liquid crystal-laser transparent display system according to claim 6, wherein the light source is a laser light source.

\* \* \* \* \*